United States Patent
Kondrad et al.

(10) Patent No.: US 10,479,306 B2
(45) Date of Patent: Nov. 19, 2019

(54) RESTRAINT BAR FOR VEHICLE SEATING ASSEMBLY

(71) Applicant: Ford Global Technologies, LLC, Dearborn, MI (US)

(72) Inventors: Marcos Silva Kondrad, Macomb Township, MI (US); Johnathan Andrew Line, Northville, MI (US); Brian Robert Spahn, Plymouth, MI (US); Srinivasan Sundararajan, Ann Arbor, MI (US); Derek Board, Ferndale, MI (US); James Chih Cheng, Troy, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 15/794,652

(22) Filed: Oct. 26, 2017

(65) Prior Publication Data

US 2019/0061665 A1  Feb. 28, 2019

Related U.S. Application Data

(60) Provisional application No. 62/549,999, filed on Aug. 25, 2017.

(51) Int. Cl.
| | |
|---|---|
| *B60R 21/02* | (2006.01) |
| *B60N 2/427* | (2006.01) |
| *B60N 2/62* | (2006.01) |
| *B60N 2/14* | (2006.01) |

(52) U.S. Cl.
CPC ............... *B60R 21/02* (2013.01); *B60N 2/14* (2013.01); *B60N 2/42727* (2013.01); *B60N 2/62* (2013.01); *B60R 2021/0273* (2013.01)

(58) Field of Classification Search
CPC ........ B60N 2/14; B60N 2/42727; B60N 2/42; B60N 2/62; B60N 2/427; B60N 2/42772; B60N 2/42745; B60N 2/42781; B60N 2/4279; B60R 21/02; B60R 2021/0273
USPC .......................... 297/344.21, 344.22, 344.23
See application file for complete search history.

(56) References Cited

U.S. PATENT DOCUMENTS

| | | | | |
|---|---|---|---|---|
| 4,230,366 A * | 10/1980 | Ruda | ................... | B60N 2/3081 280/748 |
| 4,509,798 A * | 4/1985 | Strothers | ................. | B60R 21/02 297/469 |
| 4,913,498 A * | 4/1990 | Forlivio | ............... | B60N 2/3084 297/238 |
| 5,026,118 A * | 6/1991 | Vander Stel | ......... | B60N 2/3084 297/238 |
| 5,100,199 A * | 3/1992 | Vander Stel | ......... | A61K 31/155 297/238 |
| 5,370,446 A | 12/1994 | Bancod | | |
| 6,485,101 B2 | 11/2002 | Kassai et al. | | |
| 6,572,189 B1 * | 6/2003 | Blaymore | ............ | B60N 2/2806 297/256.1 |

(Continued)

*Primary Examiner* — Mark R Wendell
(74) *Attorney, Agent, or Firm* — Vichit Chea; Price Heneveld LLP (57) ABSTRACT

A vehicle seating assembly includes a seat pan operably coupled to a seatback. The vehicle seating assembly further includes a restraint bar coupled to the seatback and operable between a first position and a second position. The restraint bar is equipped with at least one deployable occupant restraint and the restraint bar is generally U-shaped.

17 Claims, 5 Drawing Sheets

(56) References Cited

U.S. PATENT DOCUMENTS

| | | | |
|---|---|---|---|
| 7,887,140 B1* | 2/2011 | Forlivio | B60N 2/26 |
| | | | 297/238 |
| 9,699,537 B2 | 7/2017 | Oswald et al. | |
| 2001/0040401 A1 | 11/2001 | Lin | |
| 2002/0195868 A1* | 12/2002 | Tsai | B60N 2/265 |
| | | | 297/487 |
| 2006/0055228 A1* | 3/2006 | Tsai | B60N 2/2812 |
| | | | 297/488 |
| 2010/0102604 A1 | 4/2010 | Barnes et al. | |
| 2013/0147247 A1* | 6/2013 | Sims | A47D 1/008 |
| | | | 297/256.15 |
| 2015/0130149 A1* | 5/2015 | Sims | B60N 2/286 |
| | | | 280/47.38 |
| 2015/0166185 A1* | 6/2015 | Oleson | B64D 11/0619 |
| | | | 297/216.1 |
| 2016/0114706 A1* | 4/2016 | Hutchinson | B60N 2/2821 |
| | | | 297/256.13 |
| 2017/0080887 A1* | 3/2017 | Evans | B60R 21/18 |

* cited by examiner

RESTRAINT BAR FOR VEHICLE SEATING ASSEMBLY

CROSS-REFERENCE TO RELATED APPLICATION

This application claims benefit to U.S. Provisional Patent Application No. 62/549,999, entitled "RESTRAINT BAR FOR VEHICLE SEATING ASSEMBLY," filed on Aug. 25, 2017, the entire disclosure of which is hereby incorporated herein by reference.

FIELD OF THE DISCLOSURE

The present disclosure generally relates to restraint bars. More specifically, the present disclosure relates to restraint bars for vehicle seating assemblies.

BACKGROUND OF THE INVENTION

Automotive vehicles are commonly equipped with a variety of occupant restraint devices to protect occupants during collisions. Vehicle seating assemblies tend to be provided with limited degrees of freedom with respect to the mobility of the vehicle seating assembly within a cabin of the vehicle. Accordingly, the occupant restraint devices tend to be stationary and positioned at fixed locations within the vehicle. As greater degrees of freedom with respect to the mobility of the vehicle seating assembly within the cabin of the vehicle are provided, a need exists for providing the occupant of the vehicle seating assembly with occupant restraint devices at various locations within the vehicle.

SUMMARY OF THE INVENTION

According to a first aspect of the present disclosure, a vehicle seating assembly includes a seat pan operably coupled to a seatback. The vehicle seating assembly further includes a restraint bar coupled to the seatback and operable between a first position and a second position. The restraint bar is equipped with at least one deployable occupant restraint and the restraint bar is generally U-shaped.

Embodiments of the first aspect of the present disclosure can include any one or a combination of the following features:
  the restraint bar is further operable to a third position;
  the at least one deployable occupant restraint is deployed when the restraint bar is in the third position;
  the at least one deployable occupant restraint includes a first occupant restraint and a second occupant restraint;
  the first occupant restraint and the second occupant restraint deploy from the restraint bar such that a deployment path of the first occupant restraint is non-parallel to a deployment path of the second occupant restraint;
  the seatback is equipped with a third occupant restraint;
  the vehicle seating assembly further includes a seat base configured to rotate the vehicle seating assembly about a vertical axis; and
  the vehicle seating assembly further includes a thigh support positioned below the seat pan that is operable between a retracted position and an extended position.

According to a second aspect of the present disclosure, a vehicle seating assembly includes a thigh support positioned below a seat pan. The thigh support is extendable from the seat pan. A seatback that is vertically extendable relative to the seat pan, wherein the seatback is coupled to a seat base. A restraint bar is coupled to the seatback and is operable between a first position and a second position. The restraint bar is equipped with at least one deployable occupant restraint.

Embodiments of the second aspect of the present disclosure can include any one or a combination of the following features:
  the restraint bar is further operable to a third position;
  the second position displaces the restraint bar from the first position by an angle of at least about 10 degrees, and wherein the third position displaces the restraint bar from the first position by at least about 35 degrees;
  the at least one deployable occupant restraint is deployed when the restraint bar is in the third position;
  the at least one deployable occupant restraint includes a first occupant restraint and a second occupant restraint;
  the first occupant restraint and the second occupant restraint deploy from the restraint bar such that a deployment path of the first occupant restraint is non-parallel to a deployment path of the second occupant restraint;
  the seatback is equipped with a third occupant restraint; and
  the vehicle seating assembly further includes a seat base configured to rotate the vehicle seating assembly about a vertical axis.

According to a third aspect of the present disclosure, a method of operating a vehicle seating assembly includes the steps of detecting an occupant in the vehicle seating assembly, actuating a restraint bar to a second position, detecting an impact event, actuating the restraint bar to a third position, and deploying at least one occupant restraint.

Embodiments of the third aspect of the present disclosure can include any one or a combination of the following features:
  the step of deploying at least one occupant restraint further includes deploying a first occupant restraint generally downward from the restraint bar toward a seat pan of the vehicle seating assembly while the restraint bar is in the third position;
  the step of deploying at least one occupant restraint further includes deploying a second occupant restraint generally rearward from the restraint bar toward a seatback of the vehicle seating assembly while the restraint bar is in the third position; and
  the step of deploying at least one occupant restraint further includes deploying a third occupant restraint generally forward from the seatback of the vehicle seating assembly while the restraint bar is in the third position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
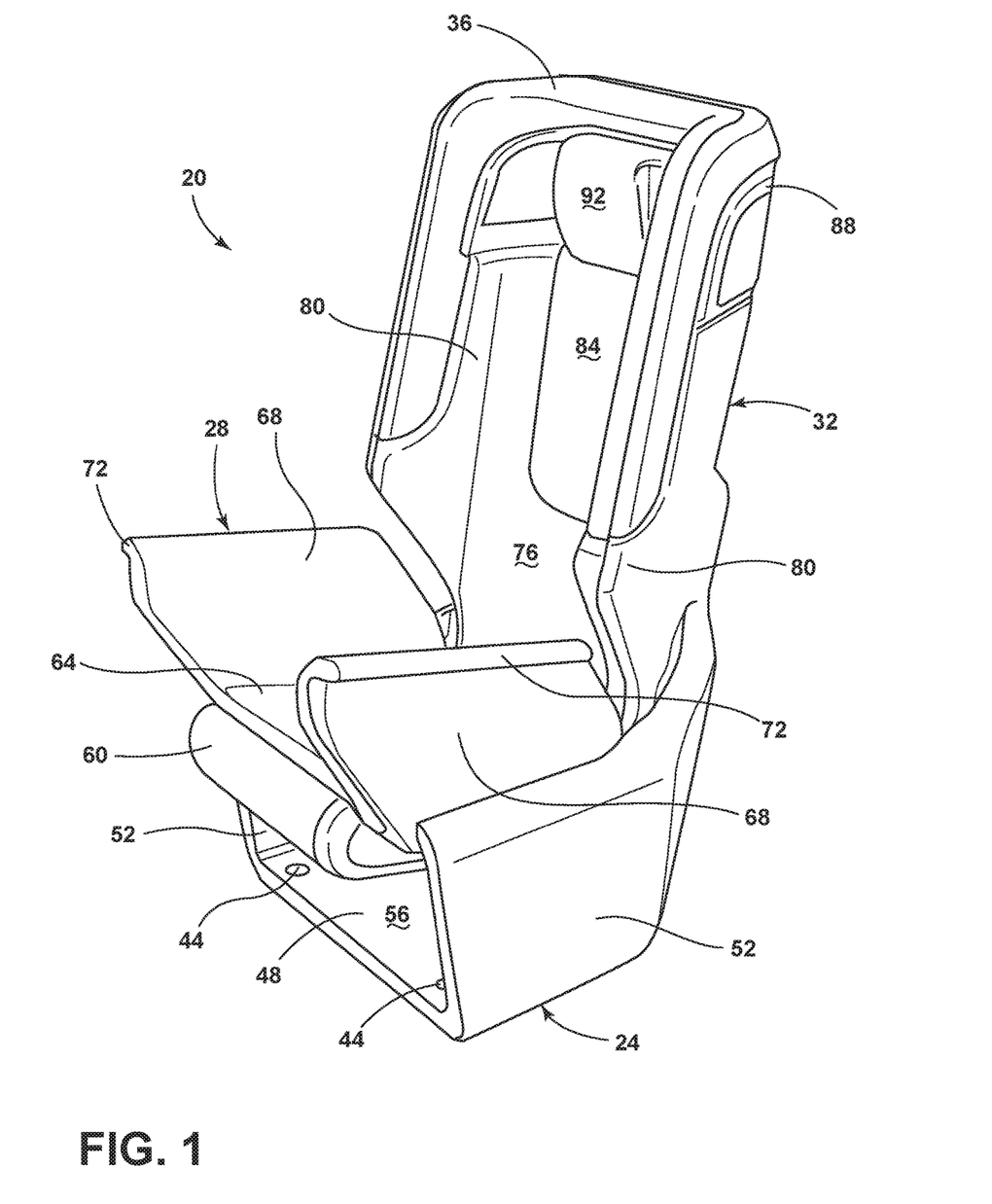
FIG. 1 is a side perspective view of a vehicle seating assembly equipped with a restraint bar in a first position, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a restraint bar. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
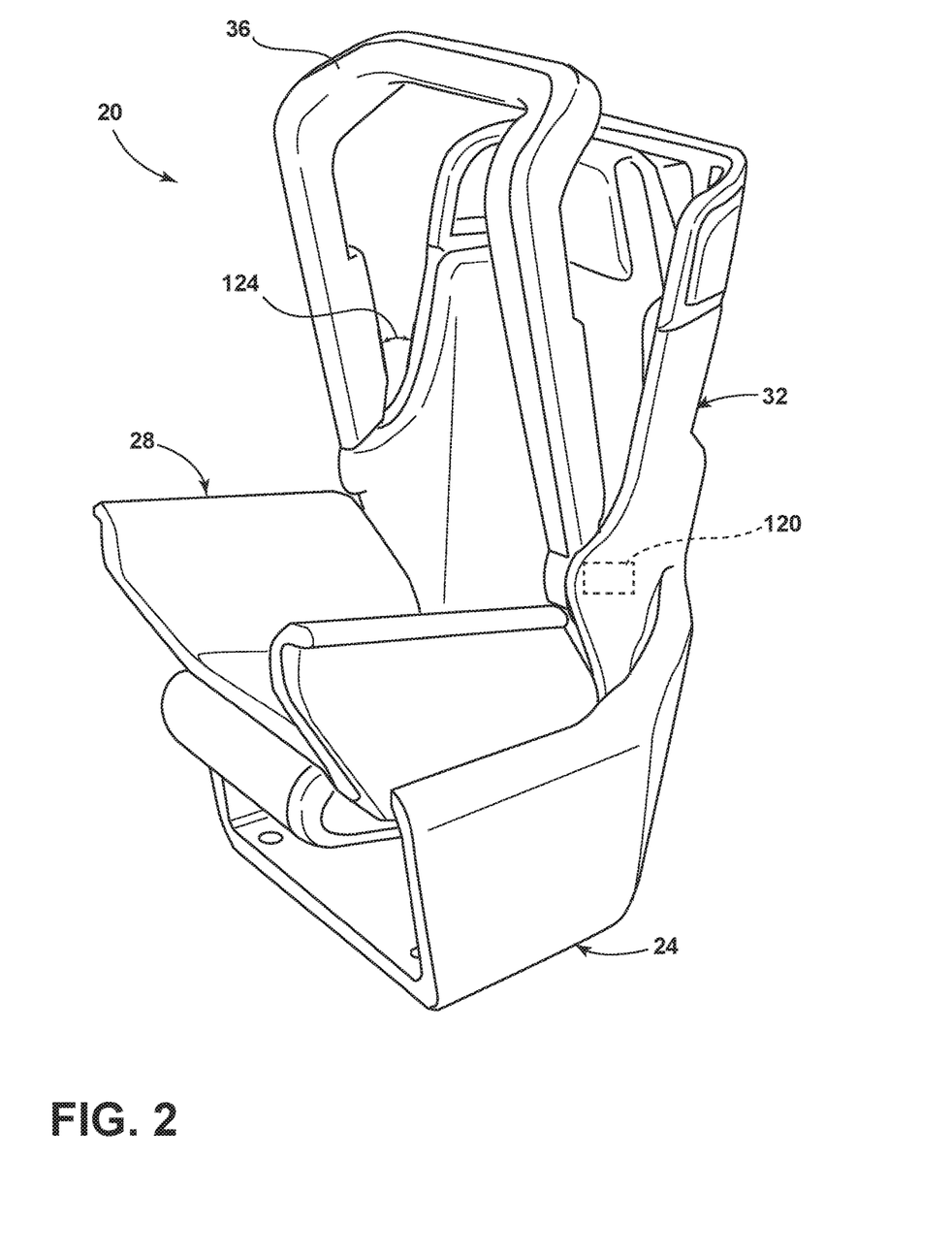
FIG. 2 is a side perspective view of the vehicle seating assembly with the restraint bar in a second position.
Figure 3:
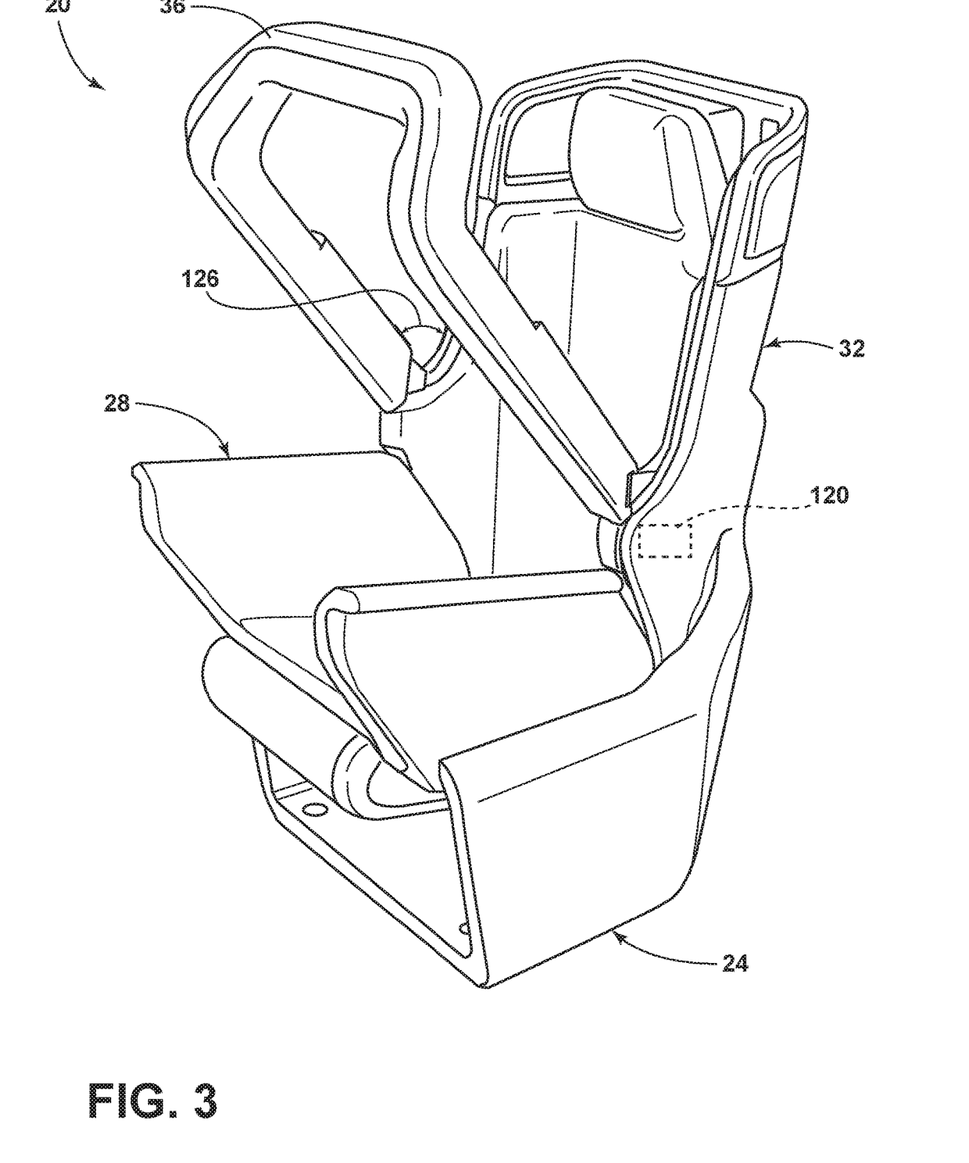
FIG. 3 is a side perspective view of the vehicle seating assembly with the restraint bar in a third position.

Referring to FIGS. 1-4, a vehicle seating assembly 20 includes a seat base 24, a seat pan 28, and a seatback 32. The seat pan 28 is operably coupled to the seatback 32. The seat base 24 is operably coupled to the seat pan 28 and/or the seatback 32. A restraint bar 36 is coupled to the seatback 32. The restraint bar 36 may be coupled to a front portion of the seatback 32 and extend about a substantial portion of a perimeter of the seatback 32. The restraint bar 36 may be operable between a first position (FIG. 1) and a second position (FIG. 2). The restraint bar 36 may be further operable to a third position (FIG. 3). In one embodiment, the first position may be referred to as a stowed position of the restraint bar 36. In another embodiment, the second position may be referred to as a stowed position of the restraint bar 36. In an alternative embodiment, the second position may be referred to as a use position of the restraint bar 36. In some embodiments, the third position may be referred to as a use position of the restraint bar 36. According to some alternative embodiments, the restraint bar 36 may pivot to a position that places the restraint bar 36 in a generally parallel relationship with the seat pan 28 when the restraint bar 36 is in the use position (e.g., about a 90 degree rotation from the stowed position to the use position). The restraint bar 36 is equipped with at least one deployable occupant restraint 40. The restraint bar 36 generally contours to the seatback 32 to present an occupant with an integrated and aesthetically pleasing appearance. In one embodiment, the restraint bar 36 may be generally U-shaped. The seat base 24 may be configured to permit rotation of the vehicle seating assembly 20 about a vertical axis to provide a swiveling motion to the vehicle seating assembly 20. Alternatively, the vehicle seating assembly 20 may be mounted to a support structure that permits rotation about a vertical axis to provide the swiveling motion to the vehicle seating assembly 20.

Referring again to FIG. 1, the seat base 24 includes one or more mounting apertures 44 that may be used for mounting the vehicle seating assembly 20 to the support structure, such as a floor of a vehicle. The seat base 24, the seat pan 28, and the seatback 32 may be formed as an integral unit. Alternatively, the vehicle seating assembly 20 may be assembled as a modular unit with the seat base 24, the seat pan 28, and the seatback 32 being assembled as separate parts of the vehicle seating assembly 20. The seat base 24 includes a lower portion 48 and two side portions 52 that extend upward from either side of the lower portion 48. The lower portion 48 and the side portions 52 of the seat base 24 are configured such that a cavity 56 exists between the lower portion 48 and the side portions 52. The cavity 56 of the seat base 24 may be utilized by an occupant of the vehicle seating assembly 20 to store personal items (e.g., a purse, luggage, shopping bags, etc.). Additionally, the cavity 56 of the seat base 24 may provide space for various components of the vehicle seating assembly 20, such as motors and other electronic equipment or wiring. Further, the cavity 56 of the seat base 24 provides space below the seat pan 28 for a thigh support 60 that is operable between a retracted position and an extended position. The thigh support 60 can be extended or retracted to fit the comfort preferences of various sizes of occupants.

Referring further to FIG. 1, the seat pan 28 includes a seat cushion 64 that is flanked on either side by side bolsters 68. The side bolsters 68 extend upward from the seat cushion 64 and may form an obtuse angle with the seat cushion 64 such that a width of the seat pan 28 increases from a smaller width at the seat cushion 64 to a larger width at a top of the side bolsters 68. Alternatively, the side bolsters 68 may form an acute angle with the seat cushion 64 such that a width of the seat pan 28 is greater at the seat cushion 64 and decreases as the side bolster 68 is traversed in a vertical direction. In some embodiments, the side bolsters 68 may include a curved portion 72 at an upper extreme thereof that is both aesthetically appealing in appearance and may serve as armrests for an occupant of the vehicle seating assembly 20. The seatback 32 includes a central portion 76 that is flanked on either side by side wings 80. The central portion 76 of the seatback 32 further includes a seatback cushion 84. The seatback 32 may include an upper region 88 that is equipped with a headrest 92. Sides of the upper region 88 of the seatback 32 may include viewing apertures, audio speakers, task lighting, ventilation, and/or additional padding for an occupant. The seatback 32 may be coupled to the seat base 24 by a track system that allows the entire seatback 32 to be actuated through a vertical displacement of up to about 150 mm between a lowered position and a raised position, such that various sized occupants may customize the vehicle seating assembly 20 according to their height and comfort preferences. The restraint bar 36 is coupled to a front portion of the seatback 32 and extends vertically upward along a substantial portion of the side wings 80 of the seatback 32 and contours to a front portion of the upper region 88 and a top portion of the upper region 88 such that the restraint bar 36 extends about a perimeter of the seatback 32. The restraint bar 36 is thereby positioned as a forward most extreme and an uppermost extreme of a substantial portion of the seatback 32. Accordingly, the restraint bar 36 may be a generally U-shaped structure. The size and positioning of the side wings 80 provide lateral restraint and additional support to an occupant during vehicle maneuvers as well as additional retention and/or protection to the occupant in the event of a collision.

Referring now to FIG. 2, the restraint bar 36 is shown in the second position, which is pivoted forward of the first position. The restraint bar 36 may be placed in the second position when an occupant is detected in the vehicle seating assembly 20 (e.g., by a proximity sensor, weight sensor, seatbelt sensor, or the like). Actuation of the restraint bar 36 from the first position (FIG. 1) to the second position may be accomplished by an actuator 120 that causes the restraint bar 36 to pivot about pivot points on opposite ends of the restraint bar 36. The actuator 120 may be positioned within at least one of the side wings 80 of the seatback 32. The actuator 120 may act on a hinge that hingedly couples the restraint bar 36 to the seatback 32. The actuator 120 may be, but is not limited to, a motor, a solenoid, a cable pulley system, or the like, including combinations thereof. The actuator 120 may further include a pyrotechnic or small explosive for rapid deployment of the restraint bar 36. The second position of the restraint bar 36 places the restraint bar 36 in a staged or primed state such that the restraint bar 36 may be rapidly deployed to a third position, which will be discussed in detail below. The second position of the restraint bar 36 may place the restraint bar 36 at a first angle 124 relative to the seatback 32. In some embodiments, the first angle 124 of the restraint bar 36 relative to the seatback 32 may be at least about 10 degrees, at least about 15 degrees, at least about 20 degrees, at least about 25 degrees, at least about 30 degrees, less than about 35 degrees, less than about 40 degrees, less than about 45 degrees, less than about 50 degrees, less than about 55 degrees, less than about 60 degrees, and combinations and ranges thereof, including intermediate values. In some embodiments, the second position may be a use position. In alternative embodiments, the second position may be a stowed position. In further embodiments, the second position may be the use position and the stowed position, such as embodiments that utilize a stationary restraint bar 36.

Referring to FIG. 3, the restraint bar 36 is shown in the third position pivoted forward of the second position. Actuation of the restraint bar 36 to the third position by the actuator 120 may occur, for example, when an impact event is detected or an impact event is determined to be imminent (e.g., by sensors on the vehicle). Impact events include, but are not limited to, vehicle-to-vehicle impacts. The restraint bar 36 may be actuated from the second position to the third position, according to one embodiment. In some embodiments, the restraint bar 36 may be actuated from the first position to the third position. The third position of the restraint bar 36 may place the restraint bar 36 at a second angle 126 relative to the seatback 32. In some embodiments, the second angle 126 of the restraint bar 36 relative to the seatback 32 may be at least about 35 degrees, at least about 40 degrees, at least about 45 degrees, at least about 50 degrees, less than about 55 degrees, less than about 60 degrees, less than about 65 degrees, and combinations and ranges thereof, including intermediate values.

Figure 4:
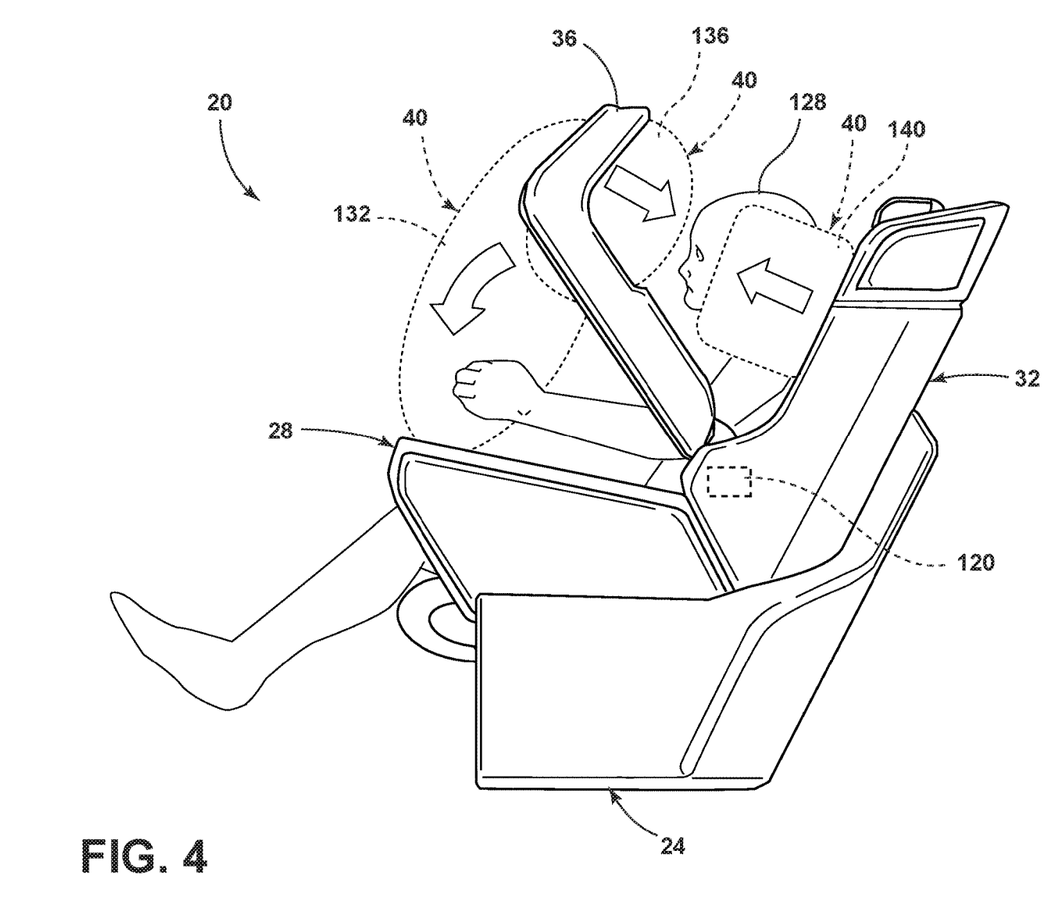
FIG. 4 is a side view of the vehicle seating assembly with the restraint bar in the third position and occupant restraints in deployed positions.

Referring now to FIG. 4, an occupant 128 is shown seated in the vehicle seating assembly 20 with the restraint bar 36 in the third position. Accordingly, in this position an impact event has been detected or has been determined to be imminent. An impact event or anticipated impact event may be detected by use of vehicle collision sensors. A first occupant restraint 132 and a second occupant restraint 136 have been deployed from the restraint bar 36 as shown. Additionally, a third occupant restraint 140 has been deployed from the seatback 32. The first occupant restraint 132 and the second occupant restraint 136 deploy from the restraint bar 36 such that a deployment path of the first occupant restraint 132 is non-parallel to a deployment path of the second occupant restraint 136. The deployment path of the third occupant restraint 140 may be generally parallel and opposite in direction to the deployment path of the second occupant restraint 136. The first occupant restraint 132 may deploy in a generally downward and/or arcuate direction toward the seat pan 28. The deployment path of the second occupant restraint 136 may extend generally rearward and/or downward toward the seatback 32. The deployment path of the third occupant restraint 140 may extend generally forward and/or upward from the seatback 32. In some embodiments, the force exerted by the first occupant restraint 132, the second occupant restraint 136, and/or the third occupant restraint 140 may be sufficient to actuate the restraint bar 36 from the stowed position to the use position.

Referring again to FIG. 4, while the vehicle seating assembly 20 is depicted with the first, second, and third occupant restraints 132, 136, 140 it is contemplated that the first, second, or third occupant restraints 132, 136, 140 may be used individually to the exclusion of the remaining occupant restraints or only two of the occupant restraints 40 may be used without departing from the concepts disclosed herein. The occupant restraints 40 may be configured to deploy only when the restraint bar 36 is actuated to the third position. Regardless of the number of occupant restraints 40 utilized, the occupant restraints 40 are configured to restrain and protect the occupant 128 during impact events. The occupant restraints 40 may be, for example, deployable airbags. As vehicles are developed that allow the vehicle seating assembly 20 to traverse through greater degrees of freedom within a cabin of a vehicle, a problem arises of providing the occupant 128 with a safe ride and/or user experience regardless of lateral, longitudinal, and/or rotational positioning within the cabin of the vehicle. Accordingly, the vehicle seating assembly 20 of the present disclosure provides a plurality of deployable restraint measures aimed at protecting the occupant 128 during impact events.

Figure 5:
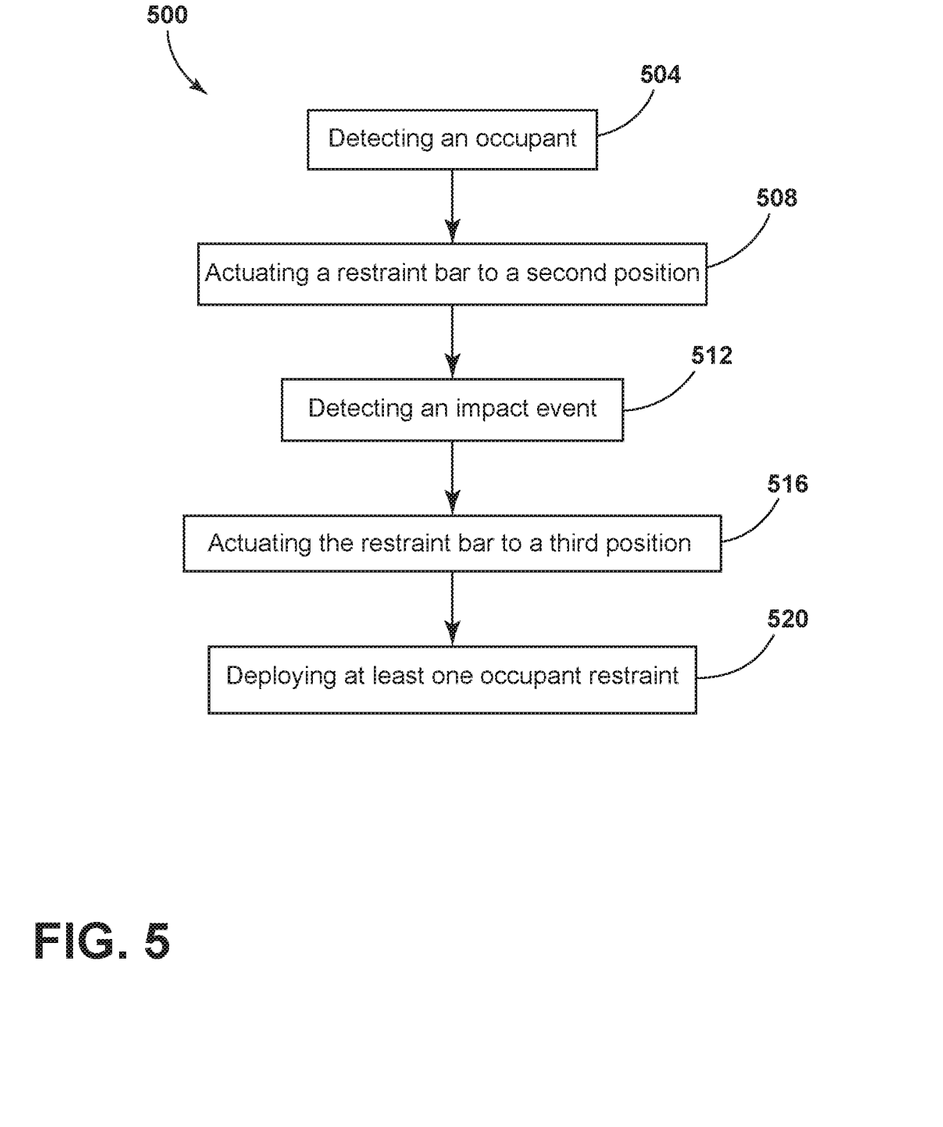
FIG. 5 is a flowchart depicting a method of operating the vehicle seating assembly.

Referring to FIG. 5, a method 500 of operating the vehicle seating assembly 20 is shown according to one embodiment. The method 500 of operating the vehicle seating assembly 20 may include the step 504 of detecting the occupant 128 in the vehicle seating assembly 20. Once the occupant 128 has been detected in the vehicle seating assembly 20 the method of operating the vehicle seating assembly 20 may advance to the step 508 of actuating the restraint bar to the second position. Next, the method 500 of operating the vehicle seating assembly 20 may advance to the step 512 of detecting an impact event. Once the impact event has been detected at step 512, the method 500 of operating the vehicle seating assembly 20 may advance to the step 516 of actuating the restraint bar to the third position. Upon reaching the third position, the method 500 of operating the vehicle seating assembly 20 may advance to the step 520 of deploying at least one occupant restraint 40. In some embodiments, the method 500 of operating the vehicle seating assembly 20 may advance from the step 504 of detecting the occupant 128 in the vehicle seating assembly 20 to the step 512 of detecting an impact event. Next, once the impact event has been detected in step 512, then the method 500 of operating the vehicle seating assembly 20 may advance to the step 508 of actuating the restraint bar to the second position. Said another way, it is contemplated that the method 500 of operating the vehicle seating assembly 20 may reorder the steps such that the step 512 of detecting an impact event precedes the step 508 of actuating the restraint bar to the second position. In some embodiments, the method 500 of operating the vehicle seating assembly 20 may include the step of returning the restraint bar 36 to the first position, which may be a stowed position, if the detected imminent impact event, risk, or threat subsides and no actual impact event has occurred. The step 520 of deploying at least one occupant restraint 40 may further include the step of deploying the first occupant restraint 132 generally downward from the restraint bar 36 toward the seat pan 28 of the vehicle seating assembly 20 while the restraint bar 36 is in the third position. In some embodiments, the step 520 of deploying at least one occupant restraint 40 may further include the step of deploying the second occupant restraint 136 generally rearward from the restraint bar 36 toward the seatback 32 of the vehicle seating assembly 20 while the restraint bar 36 is in the third position. In further embodiments, the step 520 of deploying at least one occupant restraint 40 may further include the step of deploying the third occupant restraint generally forward from the seatback 32 of the vehicle seating assembly 20 while the restraint bar 36 is in the third position.

Vehicle seating assemblies 20 tend to be provided with limited degrees of freedom with respect to the mobility of the vehicle seating assembly 20 within a cabin of a vehicle. Accordingly, occupant restraint devices tend to be stationary and positioned at traditional fixed locations within the vehicle. As greater degrees of freedom with respect to the mobility of the vehicle seating assembly 20 within the cabin of the vehicle are provided, a need exists for providing the occupant 128 of the vehicle seating assembly 20 with occupant restraint devices at various locations within the vehicle. Accordingly, the vehicle seating assembly 20 of the present disclosure provides occupant restraint devices, such as the first, second, and third occupant restraints 132, 136, 140, that can be co-localized (e.g., installed on the vehicle seating assembly 20) with the vehicle seating assembly 20 such that as the vehicle seating assembly 20 traverses various locations within the vehicle, the occupant restraints 40 similarly traverse the various locations within the vehicle.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seatback having a central portion that is flanked on either side by side wings;
   a seat pan operably coupled to the seatback; and a restraint bar coupled to a front portion of the seatback such that the restraint bar extends vertically upward along a substantial portion of the side wings of the seatback, wherein the restraint bar is operable between a stowed position and a staged position, wherein the restraint bar is equipped with at least one deployable occupant restraint, and wherein the restraint bar is generally U-shaped.

2. The vehicle seating assembly of claim 1, wherein the restraint bar is further operable to a deployed position.

3. The vehicle seating assembly of claim 2, wherein the at least one deployable occupant restraint is deployed when the restraint bar is in the deployed position.

4. The vehicle seating assembly of claim 3, wherein the at least one deployable occupant restraint comprises a first occupant restraint and a second occupant restraint.

5. The vehicle seating assembly of claim 4, wherein the first occupant restraint and the second occupant restraint deploy from the restraint bar such that a deployment path of the first occupant restraint is non-parallel to a deployment path of the second occupant restraint.

6. The vehicle seating assembly of claim 4, wherein the seatback is equipped with a third occupant restraint.

7. The vehicle seating assembly of claim 1, wherein the seatback comprises an upper region, and wherein the restraint bar is contoured to a front portion and a top portion of the upper region such that the restraint bar extends about a perimeter of the seatback.

8. A vehicle seating assembly, comprising:
a seatback comprising an upper region;
a seat pan operably coupled to the seatback; and
a restraint bar coupled to the seatback and operable between a stowed position, a staged position, and a deployed position, wherein the staged position displaces the restraint bar from the stowed position by an angle of at least about 10 degrees, wherein the deployed position displaces the restraint bar from the stowed position by an angle of at least about 30 degrees, wherein the restraint bar is equipped with at least one deployable occupant restraint, and wherein the restraint bar is contoured to a front portion and a top portion of the upper region of the seatback such that the restraint bar extends about a perimeter of the seatback.

9. The vehicle seating assembly of claim 8, wherein the at least one deployable occupant restraint is deployed when the restraint bar is in the deployed position.

10. The vehicle seating assembly of claim 9, wherein the at least one deployable occupant restraint comprises a first occupant restraint and a second occupant restraint.

11. The vehicle seating assembly of claim 10, wherein the first occupant restraint and the second occupant restraint deploy from the restraint bar such that a deployment path of the first occupant restraint is non-parallel to a deployment path of the second occupant restraint.

12. The vehicle seating assembly of claim 11, wherein the seatback is equipped with a third occupant restraint.

13. The vehicle seating assembly of claim 8, wherein the seat base is configured to rotate the vehicle seating assembly about a vertical axis.

14. A method of operating a vehicle seating assembly, comprising the steps of:
detecting an occupant in the vehicle seating assembly with an occupancy sensor;
actuating a restraint bar from a first position to a second position;
detecting an impact event;
actuating the restraint bar to a third position upon detection of the impact event; and
deploying at least one occupant restraint.

15. The method of operating a vehicle seating assembly of claim 14, wherein the step of deploying at least one occupant restraint further comprises:
deploying a first occupant restraint generally downward from the restraint bar toward a seat pan of the vehicle seating assembly while the restraint bar is in the third position.

16. The method of operating a vehicle seating assembly of claim 15, wherein the step of deploying at least one occupant restraint further comprises:
deploying a second occupant restraint generally rearward from the restraint bar toward a seatback of the vehicle seating assembly while the restraint bar is in the third position.

17. The method of operating a vehicle seating assembly of claim 16, wherein the step of deploying at least one occupant restraint further comprises:
deploying a third occupant restraint generally forward from the seatback of the vehicle seating assembly while the restraint bar is in the third position.

* * * * *